Aug. 17, 1965
D. D. GALBRAITH
3,200,973
POWER BARROW
Filed Jan. 8, 1963
3 Sheets-Sheet 1
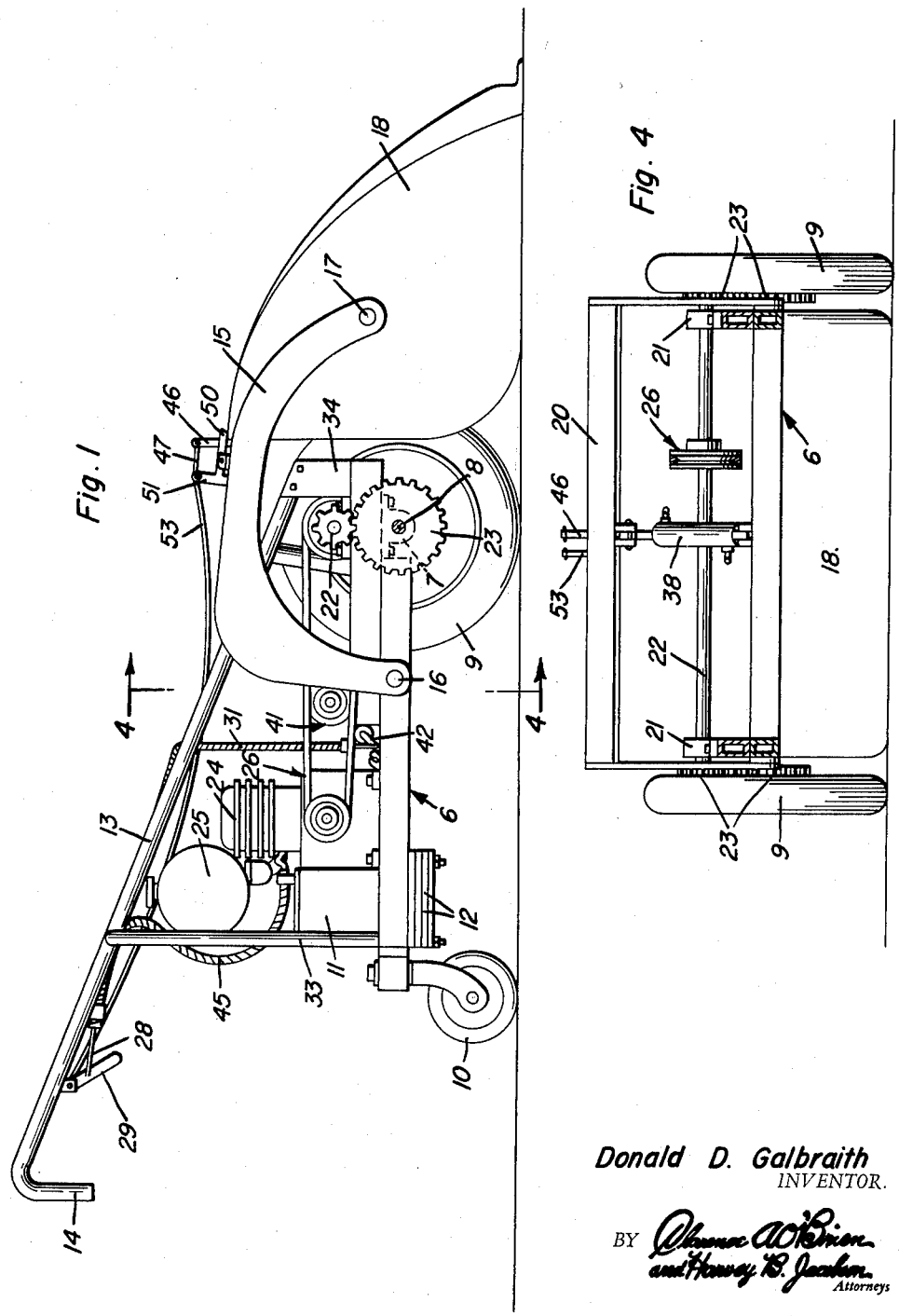
Donald D. Galbraith
INVENTOR.
BY
Attorneys

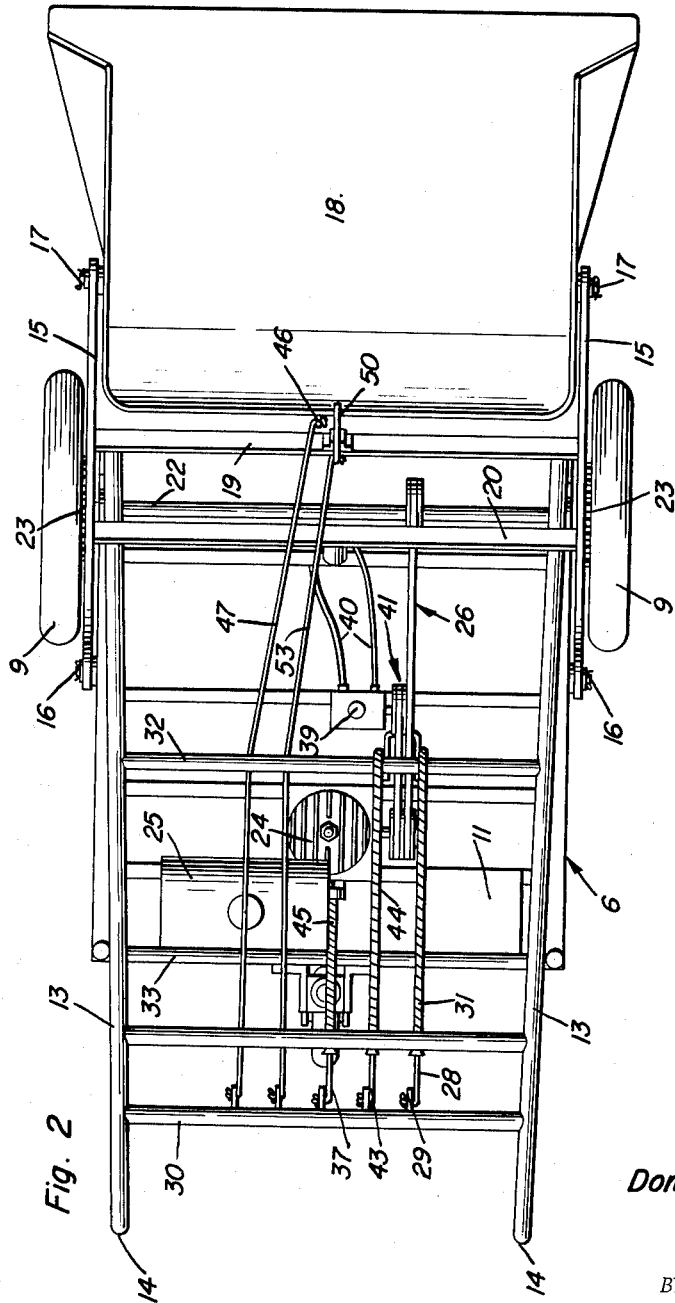

Aug. 17, 1965  D. D. GALBRAITH  3,200,973
POWER BARROW
Filed Jan. 8, 1963  3 Sheets-Sheet 3
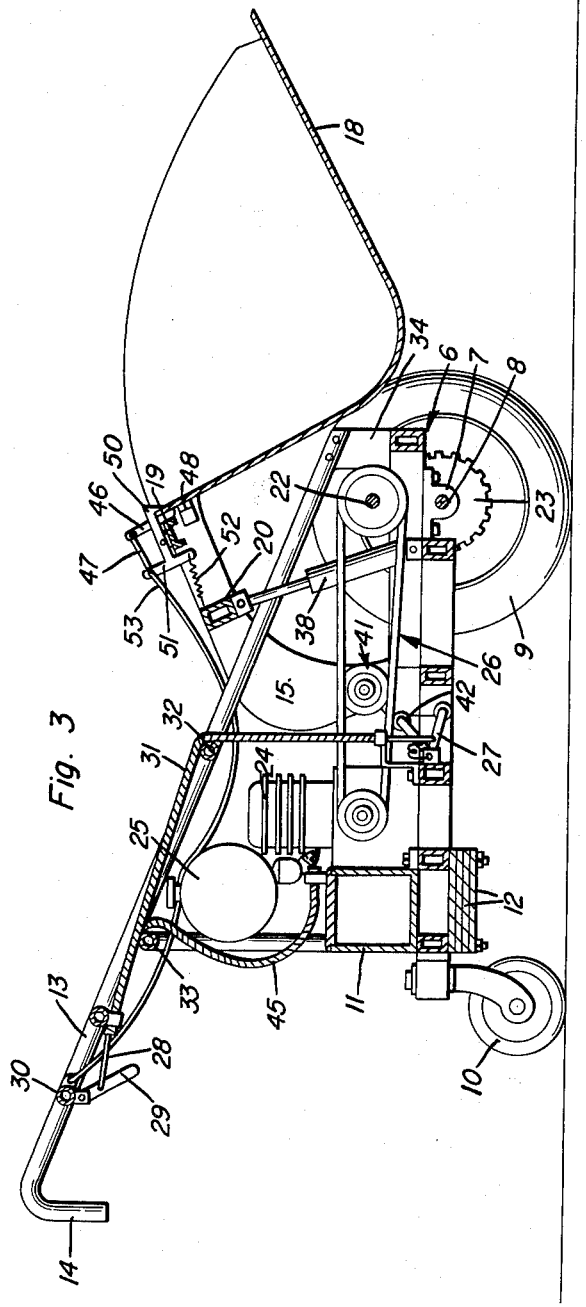
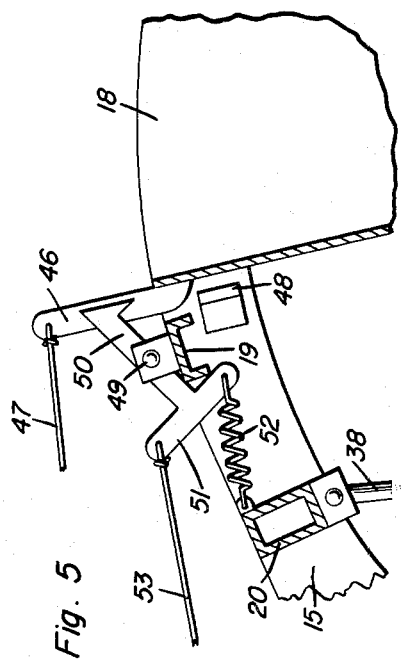
Donald D. Galbraith
INVENTOR.

United States Patent Office 3,200,973
Patented Aug. 17, 1965

3,200,973
POWER BARROW
Donald D. Galbraith, 1855 Cox Road, Aptos, Calif.
Filed Jan. 8, 1963, Ser. No. 250,074
5 Claims. (Cl. 214—140)

This invention relates to new and useful improvements in wheelbarrows or the like and has for its primary object to provide, in a manner as hereinafter set forth, a vehicle of this character which is self-propelled.

Another important object of the present invention is to provide a power actuated barrow of the aforementioned character which is also self-loading.

Still another highly important object of the invention is to provide a barrow or scoop of the character described comprising novel power means for elevating the load preparatory to conveying same to the desired location, at which the dumping is accomplished by gravity, or by hydraulic or other mechanical control.

A further object of the present invention is to provide a power barrow having novel means for releasably retaining a dumping container in load receiving position together with means for returning the container to a load receiving position and assisting in dumping the load by shaking the container while in the dumping position.

Other objects of the invention are to provide an all power barrow or scoop which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a power barrow or scoop constructed in accordance with the present invention with one wheel removed;

FIGURE 2 is a top plan view thereof;

FIGURE 3 is a view in vertical longitudinal section through the device, showing the scoop in elevated position;

FIGURE 4 is a view in transverse section, taken substantially on the line 4—4 of FIGURE 1; and FIGURE 5 is a fragmentary view in vertical longitudinal section through an upper, intermediate portion of the device, showing the latching means for the scoop.

Referring now to the drawings in detail, it will be seen that the embodiment of the invention which has been illustrated comprises a metallic frame of suitable dimensions which is designated generally by the reference numeral 6. Mounted in bearings 7 which are provided therefor beneath the front portion of the frame 6 is an axle 8. Rubber tired carrying and driving wheels 9 are mounted on the end portions of the axle 8. A caster wheel 10 supports the rear end of the frame 6 and facilitates steering the device.

Mounted on the rear portion of the frame 6 is a tool box 11. Also mounted on the rear portion of the frame 6, beneath the tool box 11, is any desired number of counterweights 12. Mounted longitudinally on the side portions of the frame 6 and projecting rearwardly therebeyond is a pair of upwardly and rearwardly inclined handle bars 13 which terminate at their rear ends in downturned grips 14.

A pair of upwardly bowed arms 15 have one end pivotally secured at 16 to the sides of the frame 6 at an intermediate point. The arms 15 extend forwardly from the frame 6 and have journaled at 17 therebetween a scoop, body or bucket 18. It will be noted that the arms 15 and the scoop 18 are journaled for vertical swinging movement on their respective pivots 16 and 17. A pair of spaced, parallel front and rear bars 19 and 20, respectively, extend between intermediate portions of the arms 15.

Journaled in bearings 21 which are provided therefor on the front portion of the frame 6, above the bearings 7, is a countershaft 22 which parallels the axle 8. Gears 23 operatively connect the countershaft 22 to the drive wheels 9 of the barrow. Mounted on the rear portion of the frame 6 is a suitable engine 24. A fuel tank 25 is provided above the engine 24, said fuel tank being located rearwardly of and above said engine for a gravity feed. A belt and pulley drive 26 operatively connects the engine 24 to the countershaft 22. Thus, the engine 24 is operatively connected to the wheels 9. A belt tightener 27 controls the drive 26. An operating cable 28 has one end connected to the tightener 27 and its other end connected to an operating lever 29 which is pivotally suspended from the tubular cross bar 30 extending between the handle bars 13 for actuating said tightener. The cable or the like 28 is slidable through a flexible tubular guide 31 which is provided therefor. Also extending between the handle bars 13, in the embodiment shown, is a tubular cross bar 32. An inverted U-shaped member 33 on the rear portion of the frame 6 supports the rear portions of the handle bars 13. The forward end portions of the handle bars 13 are affixed to upstanding brackets or the like 34 on the forward end portion of the frame 6. A hand throttle 37 on the member 30 controls the engine 24.

Pivotally mounted for vertical swinging movement on the frame structure 6 forwardly of the engine 24 is a hydraulic jack or fluid motor 38 of the cylinder and piston type. The hydraulic jack 38 is operatively connected to the bar 20 for raising and lowering the arms 15 with the scoop 18 thereon. Also mounted on the frame 6 is a fluid pump 39 which is operatively connected by hose lines 40 to the jack 38. A belt and pulley drive 41 adjacent the drive 26 operatively connects the engine 24 to the pump 39. A tightener 42 for the belt of the drive 41 controls the connection between the engine 24 and the pump 39. An actuating cable 43 is provided for the tightener 42, said cable being operable in a guide 44. A similar guide 45 is provided for the throttle cable 37.

Affixed to the rear portion of the scoop 18 is an upstanding post or arm 46. A cable or rope 47 is connected to the arm 46 for pulling the unloaded scoop 18 to the position of FIGURE 3 of the drawing, also for shaking said scoop when dumping the load. A stop 48 on either or both of the arms 15 limits swinging movement of the scoop 18 toward the position shown. The scoop may also be latched by lowering to loading position on the ground.

Pivotally mounted at 49 for vertical swinging movement on the bar 19 is a latch 50 which is engageable with the rear upper edge of the scoop 18 for releasably securing said scoop in load-carrying position. The latch 50 includes on its rear end a T-head 51 to one end of which a spring 52 is connected for yieldingly urging said latch toward operative position. A cable or the like 53 is connected to the other end of the T-head 51 for actuating the latch 50 to inoperative position against the tension of the spring 52 for releasing the scoop 18 when the load is to be dumped.

It is thought that the operation of the machine will be readily apparent from a consideration of the foregoing. Briefly, with the engine 24 in operation, the scoop 18 is lowered to the loading position of FIGURE 1 of the drawing. Of course, the speed of the engine is controlled by the throttle 37. The tightener 27 is then moved to operative position for connecting the engine 24 to the wheels 9 thus driving the scoop 18 into the materials to be transported. This phase of the operation may be manually assisted, if desired, by pushing forwardly on the grips 14. Or, the scoop may be manually filled with a shovel. During the loading operation the scoop 18 is held firmly against the stop 48 by the latch 50. When the scoop 18 has been filled or substantially so, the engine 24 is disconnected from the wheels 9 and said engine is operatively connected to the pump 39 through the medium of the tightener 42. When the pump 39 is actuated the hydraulic jack 38 is caused to swing the arms 15 upwardly thus elevating the scoop 18 to the position of FIGURE 3 of the drawing. The engine 24 is then again operatively connected to the wheels 9 for propelling the machine to the location at which the load is to be deposited. The caster wheel 10 facilitates steering the machine. When the dumping location is reached the engine 24 is again disconnected from the wheels 9 and the latch 50 is disengaged from the scoop 18. Thus, the scoop 18 is permitted to swing downwardly for emptying. By yanking on the cable 47 the scoop 18 may be shaken to expedite and ensure complete emptying. Again through the medium of the cable 47 the scoop 18, now empty, is returned to the position of FIGURE 3 of the drawing where said scoop is again secured by the latch 50. The machine is then ready to be returned to its original location to be reloaded. The scoop may also be relatched when it is lowered to the ground in readying it for reloading.

The fluid pump 39 includes a reservoir for hydraulic fluid employed in the jack 38 and the jack 33 will contract due to the weight of the arms and scoop thereby returning the scoop to a load receiving position. The barrow scoop may also be loaded when in an elevated position and operated from place to place. This is desirable when using the scoop with liquid or flowable material such as concrete, mud or the like.

As illustrated in FIGURE 2, the wheels 9 are disposed exteriorly of frame 6 in order to provide access to the wheels and the arms 15 are disposed with the inner ends hinged to the exterior of the frame thereby retaining the scoop lifting mechanism within the confines of the wheels.

The scoop 18 flares outwardly at the load receiving edge thereof so that a smooth surface or cut may be made in front of the wheels 9 for easier handling, this feature being especially desirable when cutting a ground surface to a particular grade.

If desired, a reverse gear may be incorporated in the drive in lieu of belt drive 26 and tightener to facilitate handling the machine and making it usable as a back drag for grading or spreading material. Also, the construction and arrangement of parts may be such as to permit the loaded scoop to be lifted to a higher elevation by enabling the arms to attain a higher lift. Further, the invention contemplates means for retaining the scoop in a level position at all elevations. Still further, a mechanical jack may be substituted for the hydraulic jack 38 whereby the scoop may be elevated manually.

It is to be understood that the invention of scoop loading barrow can be built to be operated manually. The same principles of design would be followed but the operation would be manual. The operator would push the lowered scoop into the load and may fill it further with a shovel or other means. Then the load would be lifted with a hand-operated built-in jack or winch. The load would then be pushed to the place of deposit and the trip rope pulled thus releasing the scoop for gravity dumping. This manually operated scoop barrow may be loaded when in an elevated position also by the use of a shovel or the like.

While the drawings and specification indicate the basic concept of the present invention, the actual article as produced or manufactured may vary as may be found practical for marketing. The power barrow may be known as a power scoop or as a barrow scoop, and may be made in many different sizes and in many different price levels depending upon consumer acceptance and manufacturing problems.

The power barrow may have various methods of power or propulsion. For example, it may be driven as illustrated in the drawings with a gas engine with a belt drive to the front wheels by the use of a belt tightener. If desired, a reverse belt tightener may be installed and the engine may be of the type that includes a clutch and transmission with proper gears for forward speeds and reverse. The power barrow may be provided with an electrical motor energized with batteries having a suitable charging device connected thereto. Mechanical adaptations may be used to facilitate all of the necessary functions of the power barrow. Further, the power barrow may be powered with any type of power that may or may not be on the market.

By constructing the power barrow with longer scoop support arms and a higher lifting hoist or jack, a much higher lift can be obtained. In conjunction with this, a device may be built onto the scoop arms, for example, parallel arms, that will keep the scoop in a level position at any height thus rendering the device ideal for loading and unloading articles from trucks, platforms or the like. The parallel arms may be used as a single arm by locking the parallel arms together.

The latching system for the scoop may be either mechanical or hydraulic so that the angle of dumping or loading may be more precisely controlled. For example, a notched half circle or segment may be provided for engagement by a suitable latch for retaining the scoop latched at different positions.

The steering and driving methods of the power barrow may be constructed in many ways with the scoop being shaped to best suit the needs of loading, containing, conveying and dumping any particular kind of materials. The cutting or leading edge of the scoop may be fitted with teeth or points that would facilitate digging, loading or raking and the like. Further, the bucket or scoop may be constructed in the nature of a hayfork for the better handling of certain materials and in certain instances may be constructed of a fork lift for handling certain pallets, boxes and the like. Further, the scoop may be fitted with a power cutter or loading reel in which case the barrow may be used as a mower. With the reel, loose material may be moved into the scoop and by utilizing a reverse gear on the reel, certain loose material is more easily removed or unloaded from the scoop.

Another feature is that different kinds of scoop devices may be interchangeable and therefore, an owner of the power barrow would be able to convert his device for any required use. Further, the device is capable of cutting to grade and use of the scoop as a back drag for grading and spreading material when desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A power wheelbarrow comprising, in combination, a horizontal frame, upper and lower parallel shafts journaled transversely on the front portion of said frame, drive wheels journaled on the end portions of the lower shaft, a caster wheel on the rear portion of the frame, rearwardly and upwardly inclined handle bars on the longitudinal side portions of the frame, an engine mounted on the frame, aligned pulleys on the engine and the upper shaft, a normally loose inoperative endless drive belt trained over said pulleys, manual means on the frame for tightening the belt for operatively connecting the engine to the upper shaft, speed reduction gears operatively connecting said upper shaft to the drive wheels, a pair of upwardly arched arms pivotally mounted for vertical swinging movement on the frame and extending forwardly therefrom, a scoop journaled for vertical swinging movement between the free end portions of said arms, a pair of spaced, parallel front and rear transverse brace bars extending between the arms, means on the frame for raising and lowering the arms, and means on the front bar for releasably securing the scoop against swinging movement in load-carrying position on the arms, the second-named means including a hydraulic jack mounted on the frame and operatively connected to the rear brace bar, a fluid pump on the frame operatively connected to said jack, aligned pulleys on the engine and said pump, a normally loose, inoperative endless drive belt trained over the second-named pulleys, and manually operable means on the handle bars for tightening the second-named belt for operatively connecting the engine to the pump.

2. A power wheelbarrow comprising, in combination, a horizontal frame, upper and lower parallel shafts journaled transversely on the front portion of said frame, drive wheels journaled on the end portions of the lower shaft, a caster wheel on the rear portion of the frame, rearwardly and upwardly inclined handle bars on the longitudinal side portions of the frame whereby a walking operator may control the wheelbarrow, an engine mounted on the frame, aligned pulleys on the engine and the upper shaft, a normally loose inoperative endless drive belt trained over said pulleys, manual means on the frame for tightening the belt for operatively connecting the engine to the upper shaft, speed reduction gears operatively connecting said upper shaft to the drive wheels, a pair of upwardly arched arms pivotally mounted for vertical swinging movement on the frame and extending forwardly therefrom, a scoop journaled for vertical swinging movement between the free end portions of said arms, a pair of spaced, parallel front and rear transverse brace bars extending between the arms, means on the frame for raising and lowering the arms, and means on the front bar for releasably securing the scoop against swinging movement in load-carrying position on the arms, the third-named means comprising a stop mounted on at least one of the arms, and engageable by the scoop, a latch pivotally mounted at an intermediate point on said front bar and engageable at one end with the scoop for releasably retaining same against the stop, a T-head on the other end of the latch, a coil spring connected to the front bar and to one end of the T-head for yieldingly engaging the latch with the scoop, and a cable connected to the other end of the T-head for manually disengaging the latch from the scoop against the tension of said coil spring.

3. A power wheelbarrow comprising, in combination, a horizontal frame, upper and lower parallel shafts journaled transversely on the front portion of said frame, drive wheels journaled on the end portions of the lower shaft, a caster wheel on the rear portion of the frame, rearwardly and upwardly inclined handle bars on the longitudinal side portions of the frame whereby a walking operator may control the wheelbarrow, an engine mounted on the frame, aligned pulleys on the engine and the upper shaft, a normally loose inoperative endless drive belt trained over said pulleys, manual means on the frame for tightening the belt for operatively connecting the engine to the upper shaft, speed reduction gears operatively connecting said upper shaft to the drive wheels, a pair of upwardly arched arms pivotally mounted for vertical swinging movement on the frame and extending forwardly therefrom, a scoop journaled for vertical swinging movement between the free end portions of said arms, a pair of spaced, parallel front and rear transverse brace bars extending between the arms, means on the frame for raising and lowering the arms, and means on the front bar for releasably securing the scoop against swinging movement in load-carrying position on the arms, the second-named means including a hydraulic jack mounted on the frame and operatively connected to the rear brace bar, a fluid pump on the frame operatively connected to said jack, aligned pulleys on the engine and said pump, a normally loose, inoperative endless drive belt trained over the second-named pulleys, and manually operable means on the frame for tightening the second-named belt for operatively connecting the engine to the pump, the third-named means comprising a stop mounted on at least one of the arms and engageable by the scoop, a latch pivotally mounted at an intermediate point on said front bar and engageable at one end with the scoop for releasably retaining same against the stop, a T-head on the other end of the latch, a coil spring connected to the front bar and to one end of the T-head for yieldingly engaging the latch with the scoop, and a cable connected to the other end of the T-head for manually disengaging the latch from the scoop, against the tension of said coil spring.

4. The combination of claim 3, together with a cable connected to the scoop and extending to the handle bars for manually shaking same when in said dumping position and for returning said scoop to said load-carrying position.

5. A power barrow comprising, in combination, a horizontal frame, means on said frame for enabling control of the power barrow by a walking operation, a pair of upwardly bowed vertically swingable arms pivotally secured at one end on an intermediate portion of the frame and extending forwardly therefrom, a forwardly opening scoop pivotally mounted between the other end portions of said arms to be lowered and raised thereby to loading and load carrying positions, an engine mounted on the frame, aligned pulleys on the engine and the upper shaft, a normally loose inoperative endless drive belt chained over said pulleys, manual means on the frame for tightening the belt for operatively connecting the engine to certain of the wheels for propelling the barrow, a fluid pump on the frame operatively connected to a pivotable hydraulic lift connected to said arms, aligned pulleys on the engine and said pump, a normally loose inoperative endless drive belt trained over the second-named pulleys, and manually operable means on said frame for tightening the second-named belt for operatively connecting the engine to the pump.

References Cited by the Examiner
UNITED STATES PATENTS

| | | | |
|---|---|---|---|
| 1,359,841 | 11/20 | Russell | 214—140 |
| 1,637,048 | 7/27 | Paulson. | |
| 2,146,807 | 2/39 | Ferari | 214—140 |
| 2,272,337 | 2/42 | Dines | 214—146 X |
| 2,332,029 | 10/43 | Thor | 214—140 |
| 2,397,303 | 3/46 | Vowless | 214—140 |
| 2,412,323 | 12/46 | Conrad | 214—140 |
| 2,746,624 | 5/56 | Stueland | 214—140 X |
| 2,781,928 | 2/57 | McNeice et al. | 214—140 |
| 2,918,133 | 12/59 | Ericsson | 180—19 |

HUGO O. SCHULZ, *Primary Examiner.*